(12) United States Patent
Tagami et al.

(10) Patent No.: US 11,321,949 B2
(45) Date of Patent: May 3, 2022

(54) DISPLAY CONTROL DEVICE, DISPLAY CONTROL SYSTEM, AND DISPLAY CONTROL METHOD

(71) Applicant: SOCIONEXT, INC., Kanagawa (JP)

(72) Inventors: Yuya Tagami, Yokohama (JP); Hiroshi Koizumi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 16/993,005

(22) Filed: Aug. 13, 2020

(65) Prior Publication Data

US 2020/0372260 A1 Nov. 26, 2020

Related U.S. Application Data

(63) Continuation of application No. PCT/JP2018/005886, filed on Feb. 20, 2018.

(51) Int. Cl.
*G06V 20/52* (2022.01)
*G06T 7/246* (2017.01)
*G06F 3/147* (2006.01)
*H04N 7/18* (2006.01)

(52) U.S. Cl.
CPC .............. *G06V 20/53* (2022.01); *G06F 3/147* (2013.01); *G06T 7/251* (2017.01); *H04N 7/181* (2013.01); *G06T 2207/30232* (2013.01)

(58) Field of Classification Search
None
See application file for complete search history.

(56) References Cited

U.S. PATENT DOCUMENTS

| 8,009,863 | B1* | 8/2011 | Sharma | G06K 9/00335 |
| | | | | 382/100 |
| 8,310,542 | B2 | 11/2012 | Girgensohn et al. | |
| 9,747,497 | B1* | 8/2017 | Sharma | G06Q 30/0201 |
| 9,852,345 | B2 | 12/2017 | Iwai et al. | |
| 2016/0034924 | A1* | 2/2016 | Sorenson | H04W 4/02 |
| | | | | 705/7.29 |
| 2016/0203499 | A1 | 7/2016 | Yamashita et al. | |
| 2017/0011410 | A1 | 1/2017 | Oshima | |

FOREIGN PATENT DOCUMENTS

| JP | 2009-134688 A | 6/2009 |
| JP | 2011-205212 A | 10/2011 |
| JP | 2512-014543 A | 1/2012 |
| JP | 2015-125671 A | 7/2015 |
| WO | 2015/033577 A1 | 3/2015 |
| WO | 2015/129210 A1 | 9/2015 |
| WO | 2017/170084 A1 | 10/2017 |

OTHER PUBLICATIONS

International Search Report and Written Opinion issued in corresponding of International Patent Application No. PCT/JP2018/005886, dated May 22, 2018, with partial translation.

* cited by examiner

*Primary Examiner* — Heather R Jones
(74) *Attorney, Agent, or Firm* — McDermott Will & Emery LLP

(57) ABSTRACT

A display control device includes a receiver configured to receive data indicating a movement of an object and data indicating a direction of a face or a body of the object, that are detected based on moving image data, and a display controller configured to output graphic data each representing a position of the object, a moving direction of the object, and the direction of the face or the body of the object, at each time point in the moving image data.

7 Claims, 19 Drawing Sheets

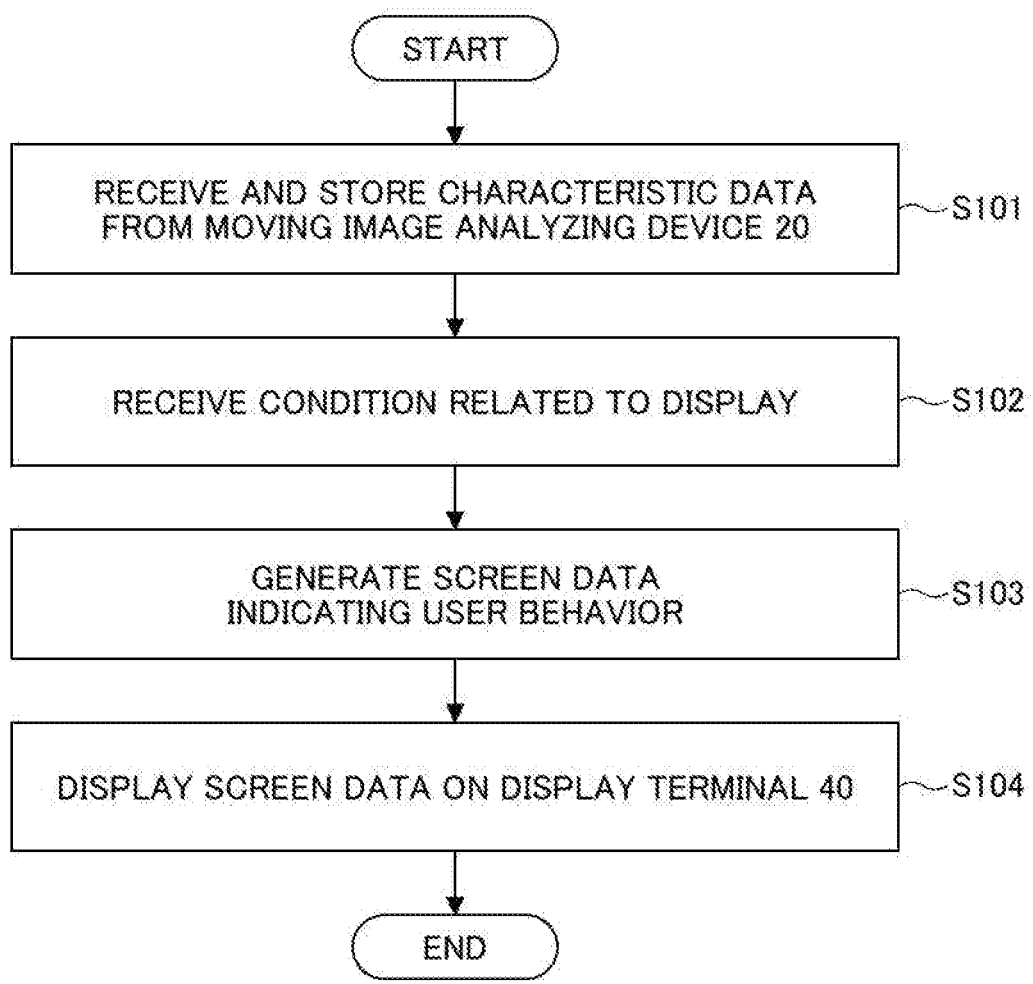

FIG.10

| FRAME ID | DATE AND TIME | OBJECT ID | AGE | GENDER | HEIGHT (cm) | POSITION | DIRECTION | ... |
|---|---|---|---|---|---|---|---|---|
| 001 | DATE AND TIME A | OBJECT A | 25 | MALE | 170 | POSITION A | DIRECTION A | ... |
| | | OBJECT B | ... | ... | ... | ... | ... | ... |
| ... | | ... | ... | ... | ... | ... | ... | ... |
| ... | | ... | ... | ... | ... | ... | ... | ... |

111

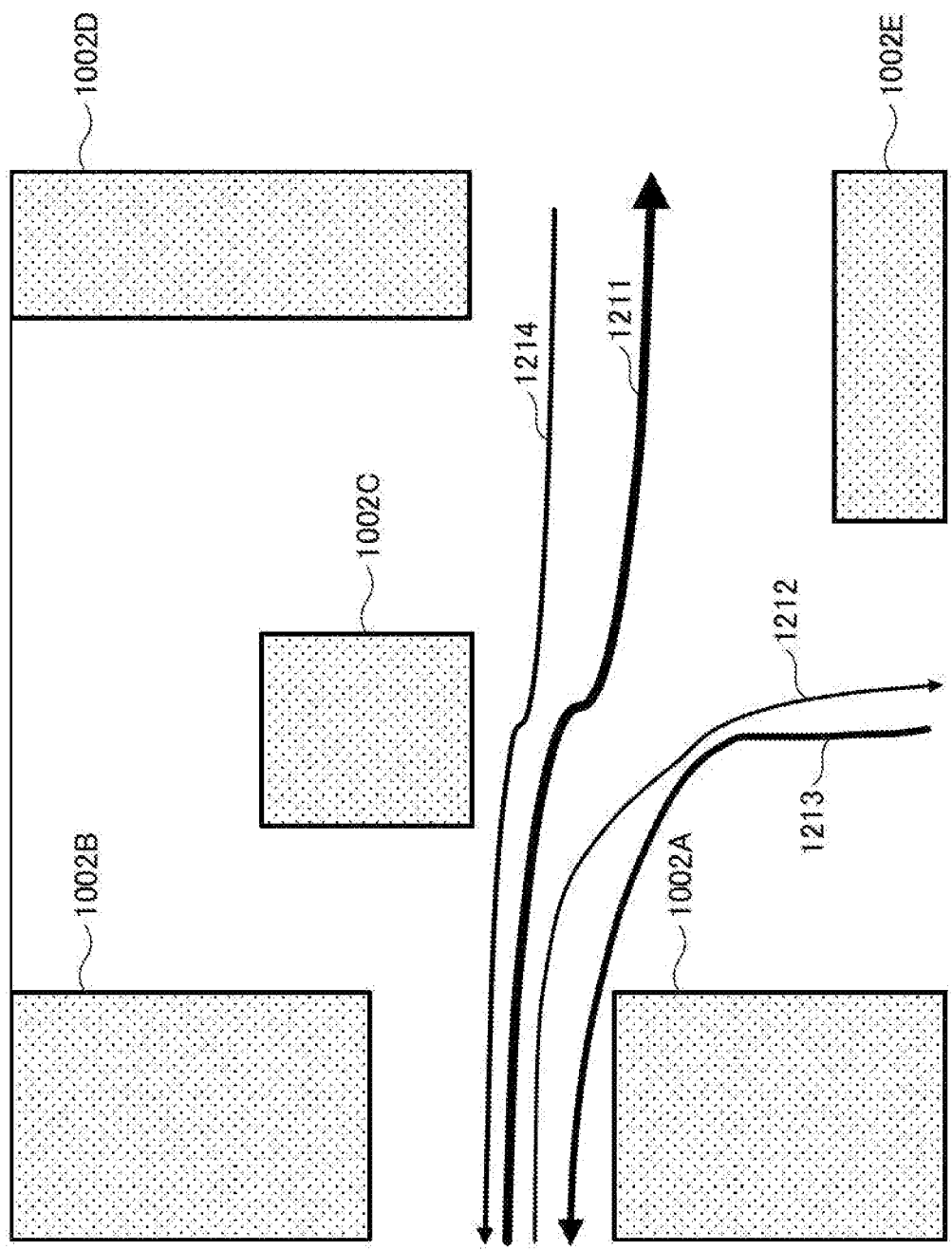

DISPLAY CONTROL DEVICE, DISPLAY CONTROL SYSTEM, AND DISPLAY CONTROL METHOD

CROSS-REFERENCE TO RELATED APPLICATIONS

The present application is a continuation application of International Application PCT/JP2018/005886 filed on Feb. 20, 2018 and designated the U.S., the entire contents of which are incorporated herein by reference.

FIELD

The disclosures herein relate to a display control device, a display control system, a display control method, and a non-transitory computer-readable recording medium having stored therein a program.

BACKGROUND

A technique to monitor behavior of an object being imaged by using moving images (i.e., video images) taken by surveillance cameras installed in stores or facilities, has been known (see, for example, Patent Documents 1 to 3).

However, in the related art, it is necessary to visually check the moving images to see states of the stores and the facilities, in order to grasp an activity state, such as which route an object being imaged (e.g., a customer) has taken, where the object has stayed, and where the object has had an interest, in the shops and facilities.

RELATED-ART DOCUMENTS

Patent Document

[Patent Document 1] Japanese Laid-Open Patent Publication No. 2009-134688
[Patent Document 2] Japanese Laid-Open Patent Publication No. 2015-125671
[Patent Document 3] Japanese Laid-Open Patent Publication No. 2012-014543

SUMMARY

According to an aspect of the embodiment, a display control device includes a receiver configured to receive data indicating a movement of an object and data indicating a direction of a face or a body of the object, that are detected based on moving image data, and a display controller configured to output graphic data each representing a position of the object, a moving direction of the object, and the direction of the face or the body of the object, at each time point in the moving image data.

BRIEF DESCRIPTION OF THE DRAWINGS

FIG. 9 is a flowchart illustrating an example of a process of displaying behavior of the object;
FIG. 10 is a drawing illustrating an example of the characteristic data;
FIG. 12B is a drawing for describing an example of a display screen representing behavior of the object.

DESCRIPTION OF EMBODIMENTS

Figure 1:
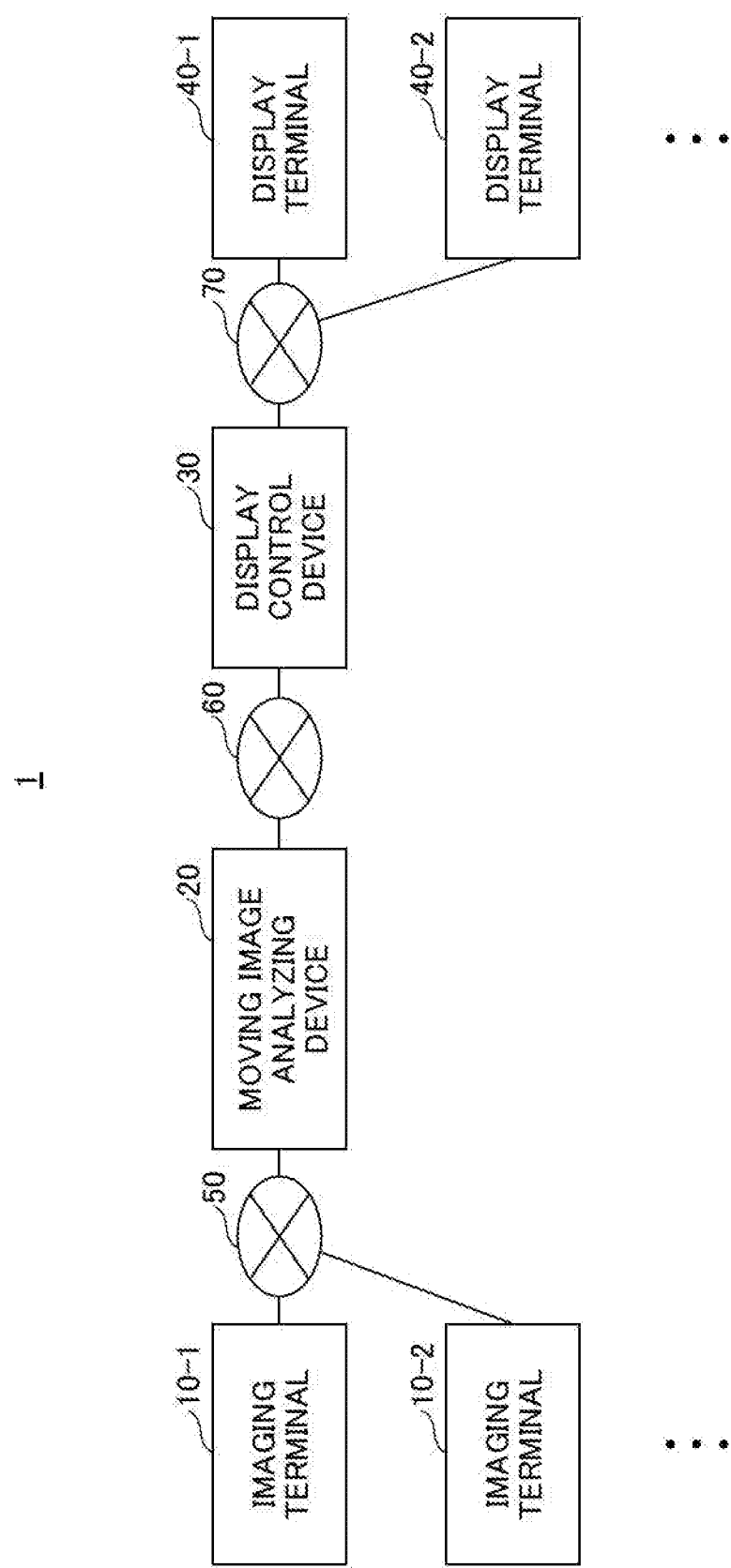
FIG. 1 is a drawing illustrating a configuration example of a communication system according to an embodiment.

In the following, an embodiment of the present invention will be described with reference to the drawings.
<System Configuration>
FIG. 1 is a drawing illustrating a configuration example of a communication system 1 (i.e., a display control system) according to the embodiment. In FIG. 1, the communication system 1 includes imaging terminals 10-1, 10-2, . . . (which will be hereinafter referred to as an "imaging terminal 10" when it is not necessary to distinguish each of the imaging terminals), a moving image analyzing device 20, a display control device 30, and display terminals 40-1, 40-2, . . . (which will be hereinafter referred to as a "display terminal 40" when it is not necessary to distinguish each of the display terminals).

The imaging terminal 10 and the moving image analyzing device 20, the moving image analyzing device 20 and the display control device 30, and the display control device 30 and the display terminal 40 are respectively connected in a communicable state by a network 50, a network 60, and a network 70, such as the Internet, a mobile phone network, a wireless local area network (LAN), or a LAN.

The imaging terminal 10 is, for example, an information processing device (i.e., computer), such as a surveillance camera, a video camera, a smartphone, or a moving image (i.e. a video image) file server. The imaging terminal 10 encodes the moving image taken by a camera and audio collected by a microphone by using a predetermined system (i.e., a "first system"). The imaging terminal 10 distributes the encoded moving image and audio to the moving image analyzing device 20 in real time through streaming distribution, for example. Alternatively, the imaging terminal 10 stores the encoded moving image and audio as a file and uploads the file to the moving image analyzing device 20 at a predetermined timing.

The moving image analyzing device 20 may be, for example, a transcoder that decodes a moving image taken and encoded by the imaging terminal 10 and that encodes the decoded moving image by using a predetermined system (i.e., a "second system"). The moving image analyzing device 20 decodes and encodes the moving image and audio received from the imaging terminal 10 and outputs the encoded moving image and audio to the display control device 30 in real time by streaming distribution, for example.

Alternatively, the moving image analyzing device 20 stores the encoded moving image and audio as a file and uploads the file to the display control device at a predetermined timing. Thus, the moving image that is received from the imaging terminal 10 and that is encoded by various encoding systems can be converted into a predetermined encoding system and can be output to the display control device 30.

The moving image analyzing device 20 detects a position of each object being imaged and a direction of a face or a body (or a trunk) of each object from each frame of the moving image taken by the imaging terminal 10. The moving image analyzing device 20 detects a moving direction and a moving amount of each object from multiple frames in the moving image taken by the imaging terminal 10.

The display control device 30 analyzes behavior of the object, for example, by artificial intelligence (AI) processing using the moving image and characteristic data received from the moving image analyzing device 20, and provides services such as behavior analysis of visitors, marketing of a shop or the like, and monitoring of suspicious persons. The display control device 30 displays the behavior of the object analyzed by AI on the display terminal 40. When a predetermined behavior is detected by the moving image analyzing device 20, the display control device 30 sends a predetermined notification to the display terminal 40.

The moving image analyzing device 20 and the display control device 30 are, for example, information processing devices (i.e., computers), such as a personal computer, an AI accelerator, a data server, and a cloud.

The display terminal 40 is, for example, an information processing device (i.e., a computer), such as a personal computer, a smartphone, a tablet terminal. The display terminal 40 displays information provided by the display control device on a screen.

Modified Example

The communication system 1 may include multiple moving image analyzing devices 20, which are moving image analyzing devices 20-1, 20-2, . . . , and may output data to the display control device 30 or may integrate the data.

<Hardware Configuration>

Figure 2:
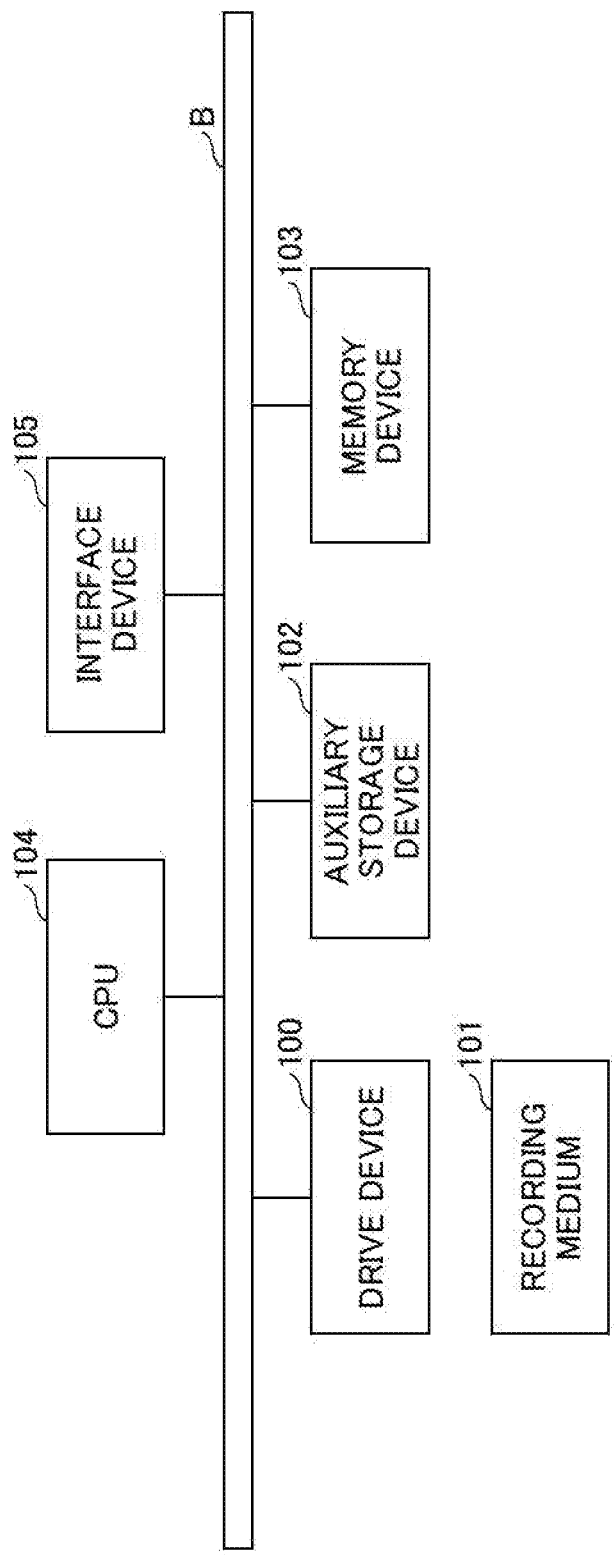
FIG. 2 is a drawing illustrating an example of hardware configurations of an imaging terminal, a moving image analyzing device, a display control device, and a display device according to the embodiment.

FIG. 2 is a drawing illustrating an example of hardware configurations of the imaging terminal 10, the moving image analyzing device 20, the display control device 30, and the display terminal 40 according to the embodiment. In the following, the display control device 30 will be described as an example. The display control device 30 of FIG. 2 includes a drive device 100, an auxiliary storage device 102, a memory device 103, a CPU 104, an interface device 105, and the like, which are interconnected by a bus B.

A moving image processing program for implementing processing of the display control device 30 is provided by a recording medium 101. The recording medium 101 in which the moving image processing program is recorded is set in the drive device 100, and the moving image processing program is installed in the auxiliary storage device 102 from the recording medium 101 through the drive device 100. However, the installation of the moving image processing program is not necessarily required to be performed by the recording medium 101, and may be downloaded from another computer through a network. The auxiliary storage device 102 stores the installed moving image processing program and stores necessary files and data, for example.

The memory device 103 reads out and stores a program from the auxiliary storage device 102 in response to an instruction to start a program. The CPU 104 achieves functions related to the display control device 30 by following the program stored in the memory device 103. The interface device 105 is used as an interface for connecting to the network.

An example of the recording medium 101 includes a portable recording medium, such as a CD-ROM, a DVD disk, or a USB memory. An example of the auxiliary storage device 102 includes a hard disk drive (HDD) or a flash memory. Both the recording medium 101 and the auxiliary storage device 102 correspond to a computer-readable recording medium. The moving image analyzing device 20 and the display control device 30 may include a graphics processing unit (GPU). The GPU may be used to perform a process of analyzing the moving image and behavior of the object.

Hardware configurations of the imaging terminal 10 and the display terminal 40 may be similar to the hardware configuration of the display control device 30. The imaging terminal 10 includes a camera (i.e., an imaging device) for taking a moving image in addition to the hardware configuration illustrated in FIG. 2.

<Configuration>

<<Moving Image Analyzing Device>>

Figure 3:
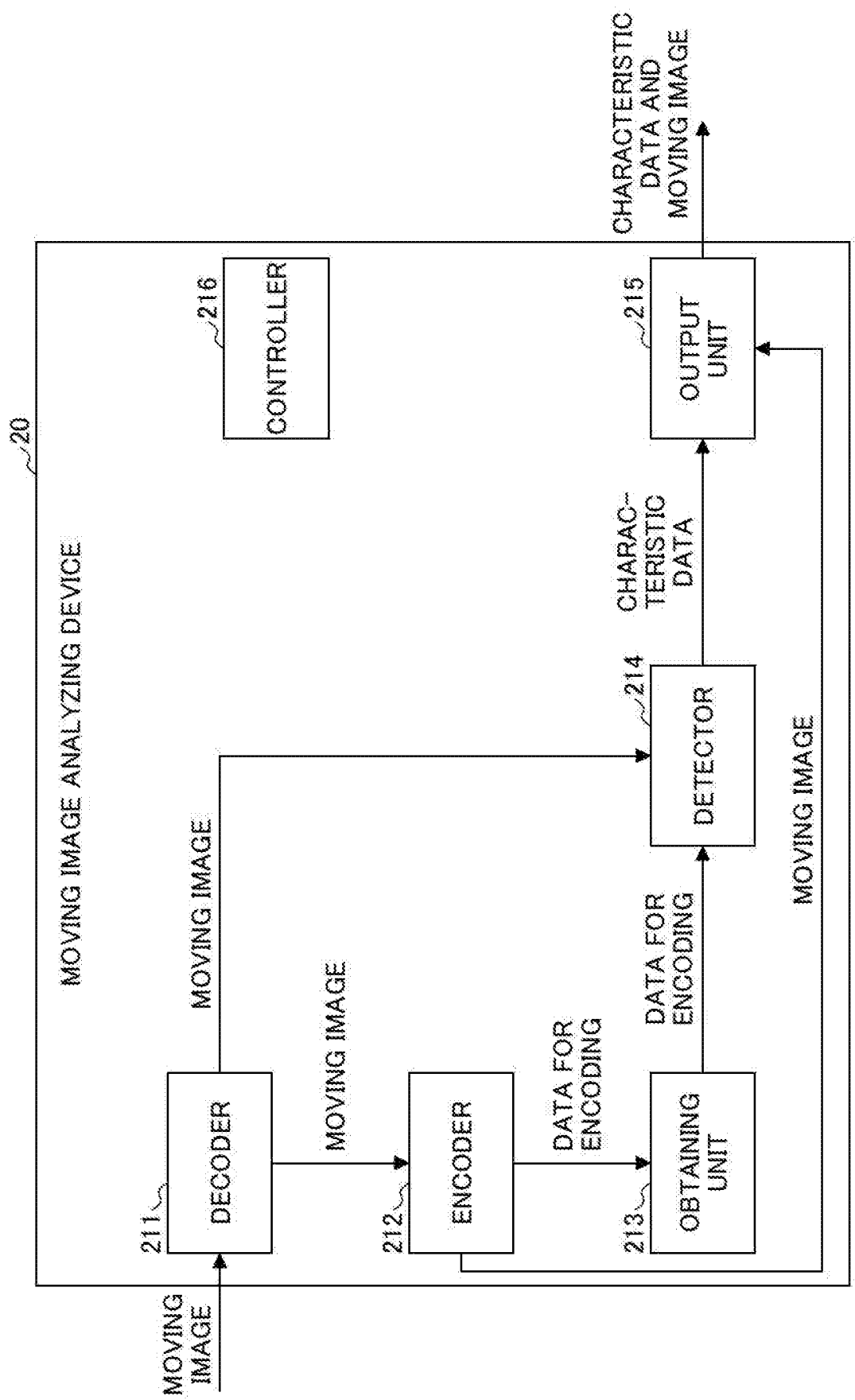
FIG. 3 is a drawing illustrating an example of a configuration block of the moving image analyzing device according to the embodiment.

Next, a configuration of the moving image analyzing device 20 will be described with reference to FIG. 3. FIG. 3 is a drawing illustrating an example of the configuration of the moving image analyzing device 20 according to the embodiment. The moving image analyzing device 20 includes a decoder 211, an encoder 212, an obtaining unit 213, a detector 214, an output unit 215, and a controller 216.

The decoder 211 is achieved by a decoding circuit or processing of one or more programs installed in the moving image analyzing device 20 executed by the CPU of the moving image analyzing device 20. When the moving image analyzing device receives a moving image of raw data that is not encoded from the imaging terminal 10 through a video cable for example, the moving image analyzing device may not include the decoder 211.

The encoder 212 is achieved by an encoding circuit or processing of one or more programs installed in the moving image analyzing device 20 executed by the CPU of the moving image analyzing device 20. When at least one of the decoder 211 and the encoder 212 is achieved by the CPU, the CPU may be a multicore processor, and decoding or encoding processing executed by the CPU and processing of detecting the characteristic data (i.e. metadata) performed by the detector 214 may be executed in parallel using different cores.

The detector 214, the output unit 215, and the controller 216 are achieved by processing of one or more programs installed in the moving image analyzing device 20 executed by the CPU of the moving image analyzing device 20. The moving image analyzing device 20 may include a circuit for implementing a detector 214, an output unit 215, or a controller 216.

The decoder 211 decodes a moving image received from the imaging terminal 10.

The encoder 212 compresses and encodes each frame of a moving image decoded by the decoder 211 by using a moving image compression standard, such as High Efficiency Video Coding (HEVC)/H.265 (which will be hereinafter referred to as "HEVC"), Advanced Video Coding (AVC)/H.264, VP9, or AV1.

The obtaining unit 213 obtains data used for compression or encoding processing of each frame of the moving image by the encoder 212.

The detector 214 detects the characteristic data based on each frame of the moving image and the data obtained by the obtaining unit 213.

The output unit 215 outputs data generated by the encoder 212 encoding the moving image and the characteristic data to the display control device 30. The output of the data generated by encoding the moving data and the characteristic data from the output unit 215 to the display control device 30 may be performed for each frame of the moving image or may be performed together for multiple frames.

The controller 216 performs entire control of the moving image analyzing device 20.

<<Display Control Device>>

Figure 4:
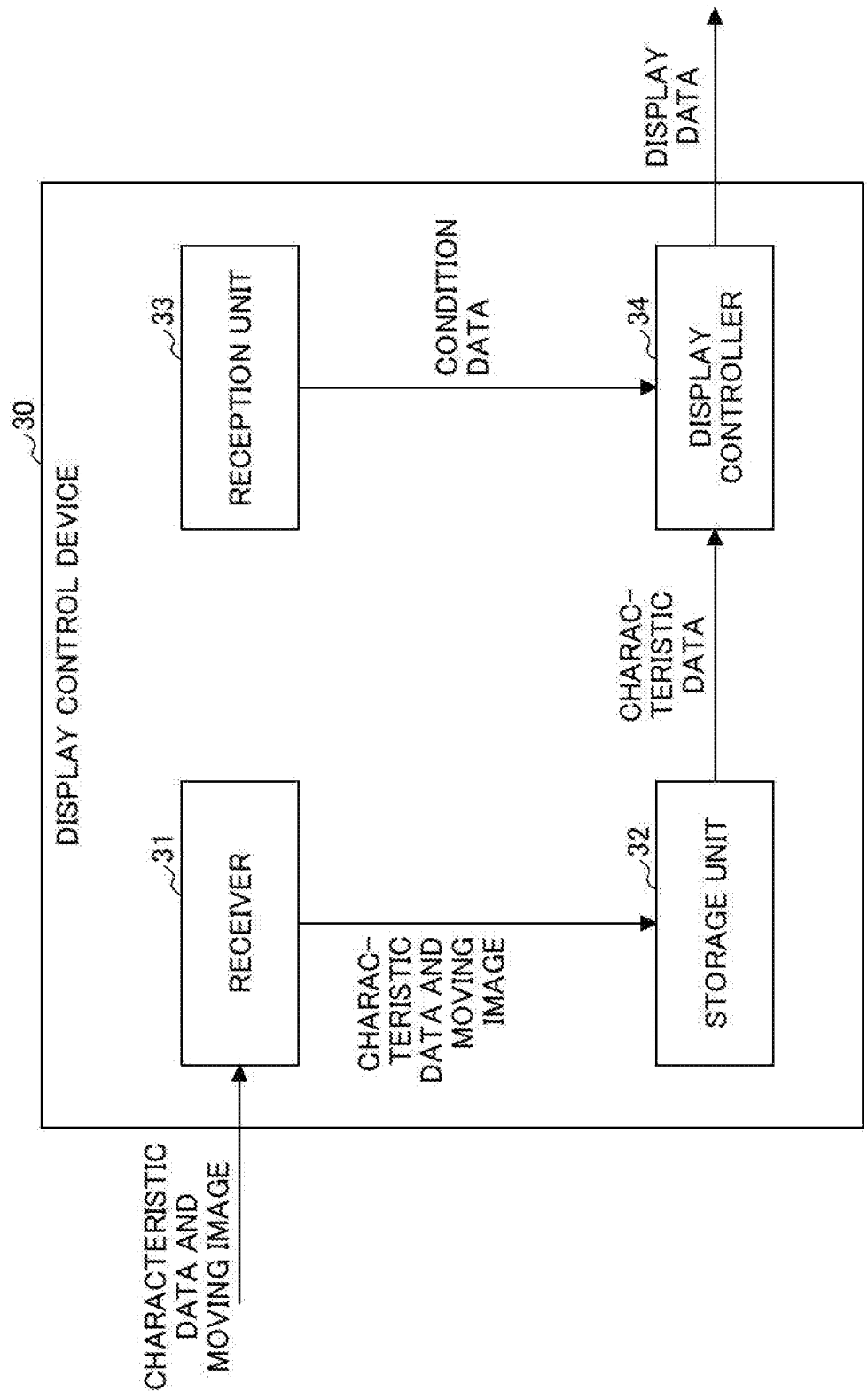
FIG. 4 is a drawing illustrating an example of a functional block of the display control device according to the embodiment.

Next, a functional configuration of the display control device 30 will be described with reference to FIG. 4. FIG. 4 is a drawing illustrating an example of a functional block of the display control device 30 according to the embodiment. The display control device 30 includes a receiver 31, a storage unit 32, a reception unit 33, and a display controller 34. Each of the functional units is achieved by processing of one or more programs installed in the display control device 30 executed by the CPU 104 of the display control device 30.

The receiver 31 receives the data generated by encoding the moving image and the characteristic data for each frame of the moving image from the moving image analyzing device 20. The characteristic data includes information about a movement of the object and a direction of the face or body of the object that are detected based on the moving image data.

The storage unit 32 stores the data generated by encoding the received moving image and the characteristic data. The reception unit 33 receives operation data from the display terminal 40 to receive an operation.

The display controller 34 outputs display screen data including graphic data representing the behavior of the object, such as a position of the object, a moving direction of the object, and a direction of the face or the body of the object, at each time point, and displays the display screen data on the screen of the display terminal 40.

<Process>

(Process of Detecting the Behavior of the Object)

Figure 5:
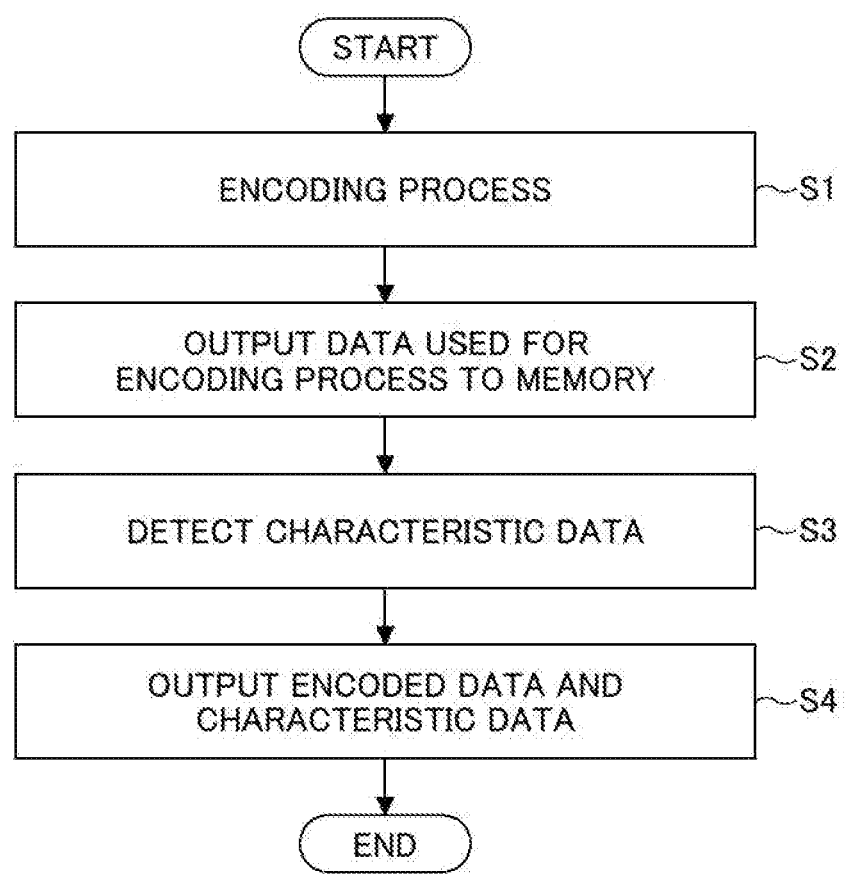
FIG. 5 is a flowchart illustrating an example of a process of detecting behavior of an object being imaged in the moving image analyzing device.

Next, a process of detecting the behavior of the object (e.g., a person) in the moving image analyzing device 20 will be described with reference to FIGS. 5 and 6. FIG. 5 is a flowchart illustrating an example of a process of detecting the behavior of the object in the moving image analyzing device 20. The following processing is performed for each frame in the moving image. Hereinafter, a given single frame in the moving image is referred to as a frame to be processed.

First, in step S1, the encoder 212 of the moving image analyzing device 20 performs a process of compressing and encoding a frame to be processed.

Subsequently, in step S2, the encoder 212 of the moving image analyzing device 20 outputs data used for the encoding process to the memory device. The data used for the encoding process may include, for example, data of each block (i.e., a coding tree unit (CTU)), which is a unit on which the encoding process is performed, a reduced image of the frame, data indicating a change between consecutive multiple frames in the moving image (data indicating a movement of each of the blocks), data indicating an area of the same color, and data of an outline of each of the blocks.

The encoding process of step S1 performed by the encoder 212 and a detecting process performed by the detector 214 may be performed in parallel.

Subsequently, in step S3, the detector 214 of the moving image analyzing device 20 detects the characteristic data representing a characteristic of the object with respect to the frame to be processed by using the frame to be processed and the data stored in the memory device. FIG. 6 is a drawing for describing an example of a process of detecting the characteristic data from the frame to be processed. The detector 214 of the moving image analyzing device 20 uses the length of each part of a human body configured in advance to estimate a position of each joint of the object from the frame to be processed. In this case, the detector 214 of the moving image analyzing device 20 determines an area to be searched in the frame to be processed based on, for example, the data stored in the memory device. Then, from within the determined area, a position of the object in the frame (i.e., coordinates), positions of the face, the trunk, the right hand, the left hand, the right foot, and the left foot of the object are detected in the frame to be processed using the data of the length of each part of the human body configured in advance.

Figure 6:
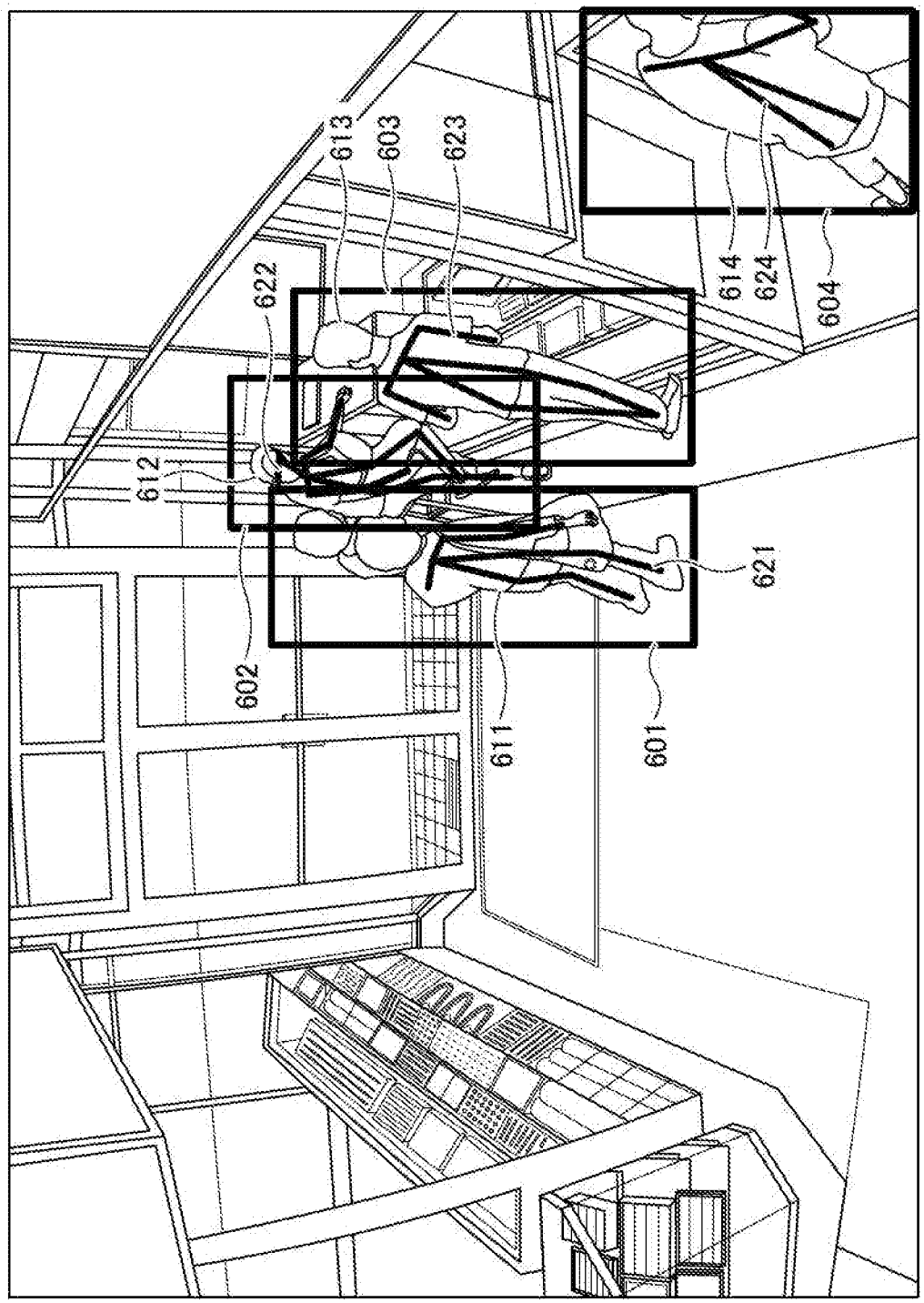
FIG. 6 is a drawing for describing an example of a process of detecting characteristic data from a frame to be processed.

The example of FIG. 6 illustrates respective areas 621 to 624 of objects 611 to 614 detected in regions 601 to 604 that have been searched in the frame to be processed. The detector 214 may detect the characteristic data by, for example, AI using machine learning such as deep learning. As described above, the data used for the encoding process can be used to greatly reduce a load of a process of detecting the characteristic data of each frame to be processed.

Subsequently, in step S4, the output unit 215 of the moving image analyzing device 20 outputs the data generated by the encoder 212 encoding the moving image and the characteristic data detected by the detector 214 of the moving image analyzing device 20, to the display control device 30.

According to the above-described process of detecting the characteristic data, for example, in a surveillance camera system for monitoring a moving image and audio from a surveillance camera, characteristic data related to the position and size of a face of the object, estimated information about age and gender of the object, and clothes of the object, such as colors of clothes, eyeglasses, a hat, a bag in the image, can be detected.

When the installation position and direction of the camera, and the viewing angle, a distortion, and characteristics of the lens are previously known, or when the camera has been calibrated with a predetermined marker or the like in advance, the characteristic data relating to the size of the imaged object and the distance from the camera can be detected.

Additionally, characteristic data related to behavior or an action that indicates what movement has been performed can be detected by tracking a movement of a recognized person or thing. In this case, the characteristic data may include information about, for example, a face (a sight line), a body (a trunk), a foot direction, hand and foot movements, a position of each joint, a face expression, and information about, for example, posture, behavior, and an action, estimated including the information above. The detector 214 may detect the information every several frames or every several seconds.

A relatively wide range of behavior may be detected from the moving images taken by multiple cameras, and a range of the detected behavior may be used as the characteristic data. This can display a track of the movement of the object (e.g., a person or thing) on the display terminal.

<Example of the Process of Detecting the Characteristic Data>

In the following, an example of the process of detecting the characteristic data will be described. Each of the following examples may be combined as appropriate.

Example 1 of a Process of Detection the Characteristic Data

As Example 1 of the process of detecting the characteristic data, an example of detecting the characteristic data related to a structure other than a background or related to the background at a relatively high speed by using a coding tree unit (CTU) that is obtained during an encoding process, such as HEVC (i.e., an example of "data used in the encoding process" and a "block") will be described.

The encoder 212 performs the encoding process on each frame (picture) in the moving image in a unit of a square pixel block called CTU by using HEVC for example. In HEVC or the like, the encoder 212 determines the size of each block in the frame in accordance with whether a contour is present in the frame image and the complexity of the contour.

Figure 7:
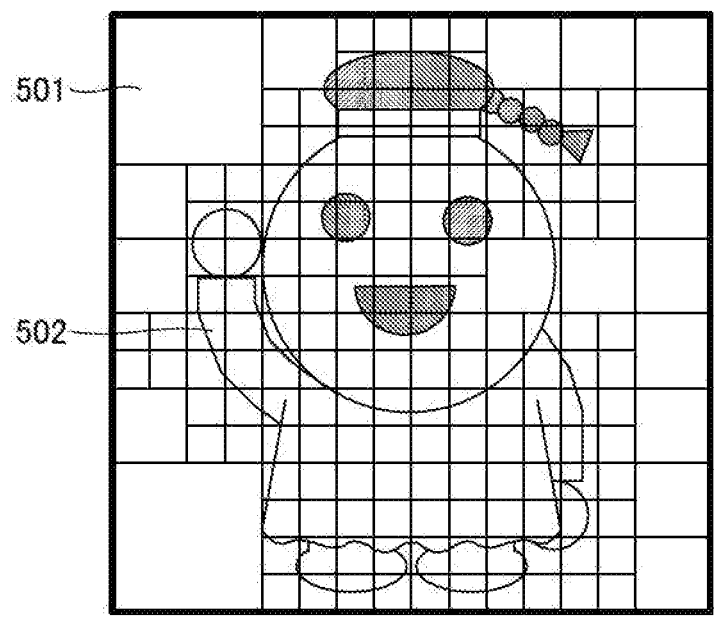
FIG. 7 is a drawing for describing an example of a CTU.

FIG. 7 is a drawing for describing an example of the CTU. As illustrated in FIG. 7, the encoder 212 partitions a flat background portion by a relatively large block (a coding block (CB)) 501. The encoder 212 partitions the contour of the object by a relatively small block 502.

When the encoder 212 has completed a block partitioning process for determining the CTU, the encoder 212 stores the CTU data in the memory device. The CTU data stored in the memory device includes data such as a layered structure of each coding tree block (CTB), which is a block of each color component signal, CB size, and adjacent CTBs.

Thus, a background, such as the sky or a wall can be distinguished from an object having a structure, such as a person or a building, or data having a similar composition can be extracted from stored data by using the CTU that is the data used in the encoding process, for example.

The detector 214 may detect, for example, an area of each object in the image by using data of the CTU. In this case, for example, when the object, such as a person, is to be detected, the detector 214 may preferentially search an area where the size of the CB is smaller than or equal to a predetermined value and may perform a process of detecting a face. This can improve the accuracy of the process of detecting the object, such as a person, and can increase the speed of the process, when the moving image is analyzed in real time, for example. In this case, a known algorithm may be used as an algorithm for detecting the object, such as a person. The search area may be only an area where the size of the CB is smaller than or equal to a predetermined value (e.g., 16×16) by using the data of the CTU. This can achieve faster detection compared with a conventional method of searching an entire image.

When a background, such as the sky or a road, is to be detected, the detector 214 may perform a process of detecting the background by using an area in which the size of the CB is greater than or equal to a predetermined value (e.g., 32×32) as the search area.

Example 2 of the Process of Detecting the Characteristic Data

As Example 2 of the process of detecting the characteristic data, an example in which the characteristic data related to a movement of the object is detected at a relatively high speed by using a reduced image (i.e., an example of "data used in the encoding process") obtained during the encoding process, will be described.

The encoder 212 generates a reduced image (i.e., a predicted image) of each frame for motion compensation in the HEVC, the AVC, or the like. When the reduced image for motion compensation is generated for the motion compensation, the encoder 212 stores the generated reduced image data in the memory device.

The detector 214 may detect, for example, the movement of each object in the image by using the reduced image data. In this case, for example, the detector 214 may obtain multiple candidates of search start point areas, select a highly similar search start point area from the multiple candidates, and search a search start point included in the selected start point area and a surrounding of the search start point in detail using the same size image.

Example 3 of the Process of Detecting the Characteristic Data

As Example 3 of the process of detecting the characteristic data, an example in which the characteristic data related to the movement of the object is detected at a relatively high speed by using data representing a change between consecutive multiple frames obtained during the encoding process (i.e., data representing a movement of a block; an example of "data used in the encoding process") will be described.

The encoder 212 generates the data representing a change between consecutive multiple frames for motion compensation in the HEVC, the AVC, or the like, for example. The data representing a change between frames may include, for example, a difference and a motion vector.

The difference is, for example, sum of absolute difference (SAD), sum of squared difference (SSD), sum of absolute transformed difference (SATD) between brightness and color values of each pixel in a predetermined area included in the current frame and brightness and color values of each pixel in the predetermined area included in the previous frame. The motion vector is data representing a moving direction of the block to be encoded that is predicted between consecutive frames.

In HEVC, AVC, and so on, motion compensation prediction is performed for each prediction unit (PU).

Figure 8A:
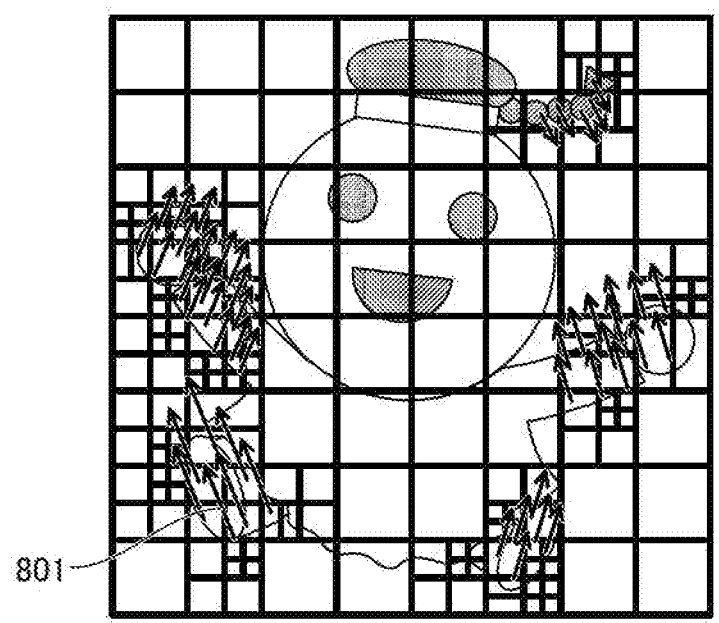
FIG. 8A is a drawing for describing a motion vector in HEVC.
Figure 8B:
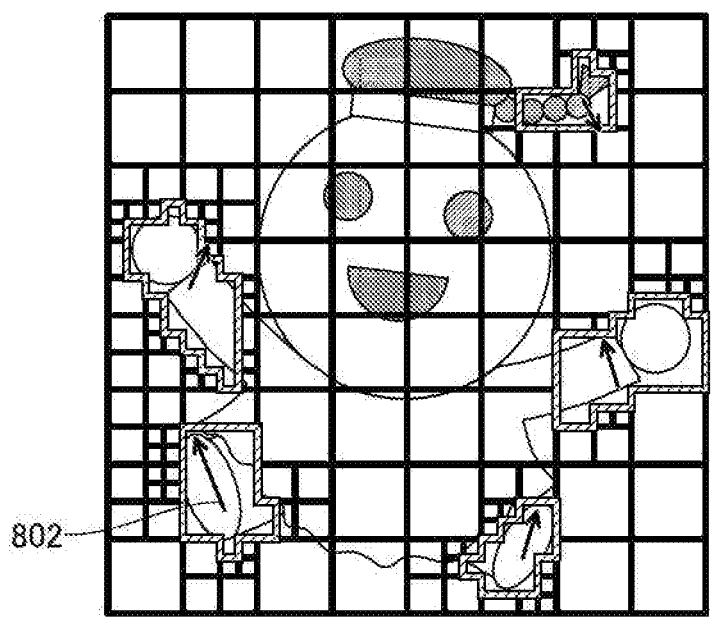
FIG. 8B is a drawing for describing a motion vector in HEVC.

FIGS. 8A and 8B are drawings for describing motion information in HEVC. Since each of the adjacent prediction units is considered to have a similar motion, a motion vector different for each of the prediction units is not encoded, and motion vectors for the adjacent prediction units are integrated and encoded in HEVC. In an example of FIG. 8A, a motion vector per prediction unit is illustrated by an arrow 801, for example. In the example of FIG. 8B, an integrated motion vector of the adjacent prediction units is illustrated by an arrow 802, for example.

When the encoder 212 generates data for motion compensation, the encoder 212 stores the generated data in the memory device.

The detector 214 may detect, for example, a movement of each object in the image by using each of the data. In this case, when, with respect to a set of a predetermined number or more prediction units, a movement of the set of the prediction units in which the size of each prediction unit is smaller than a predetermined value is integrated by the encoder 212, the detector 214 may preferentially search an area of each prediction unit included in the set. This can improve the accuracy of the process of detecting a moving object and increase the speed of the process, for example, when the moving image is analyzed in real time.

Example 4 of the Process of Detecting the Characteristic Data

As Example 4 of the process of detecting the characteristic data, an example in which the characteristic data related to the complexity is detected at a relatively high speed by using data representing the complexity of a frame obtained during the encoding process (i.e., an example of "data used in the encoding process") will be described.

The encoder 212 calculates data such as sum of absolute difference (SAD) and sum of absolute transformed difference (SATD) of brightness and color differences in a frame in an intra prediction of HEVC or AVC, for example.

The encoder 212 generates the data in the intra prediction, and stores the generated data in the memory device.

<Process of Displaying Behavior of the Object>

Next, a process of displaying behavior of the object on the display control device 30 will be described with reference to FIG. 9. FIG. 9 is a flowchart illustrating an example of the process of displaying the behavior of the object.

In step S101, the receiver 31 of the display control device 30 receives the moving image and the characteristic data from the moving image analyzing device 20 and stores the moving image and the characteristic data in the storage unit 32. FIG. is a drawing illustrating an example of characteristic data 111. Date and time and age, gender, height (cm), position, direction, and the like of each object ID that are corresponding to a frame ID are stored in the characteristic data 111 illustrated in FIG. 10. The frame ID is identification information of a frame in the moving image. The date and time are date and time when the frame has been captured. The object ID is identification information of an object detected from the frame. The age is age of the object estimated from the frame. The gender is gender of the object estimated from the frame. The height is height of the object estimated from the frame. The position is a position of the object in a space in which the imaging terminal 10 that has imaged the frame is installed. The direction is a direction of a face or a body of the object in the space.

Subsequently, in step S102, the reception unit 33 of the display control device 30 receives a condition related to a display. Here, for example, the reception unit 33 of the display control device receives specifications of an attribute of the object to be displayed, a time duration to be displayed, and the like.

The reception unit 33 of the display control device 30 may receive specifications of conditions such as a building, a season, a temperature, weather, time, a day, a week, a month, and a day of the week.

Subsequently, in step S103, the display controller 34 of the display control device 30 generates display screen data representing the behavior of the object in accordance with specified conditions.

Subsequently, in step S104, the display controller 34 of the display control device 30 displays the generated display screen data on the display terminal 40.

Figure 11A:
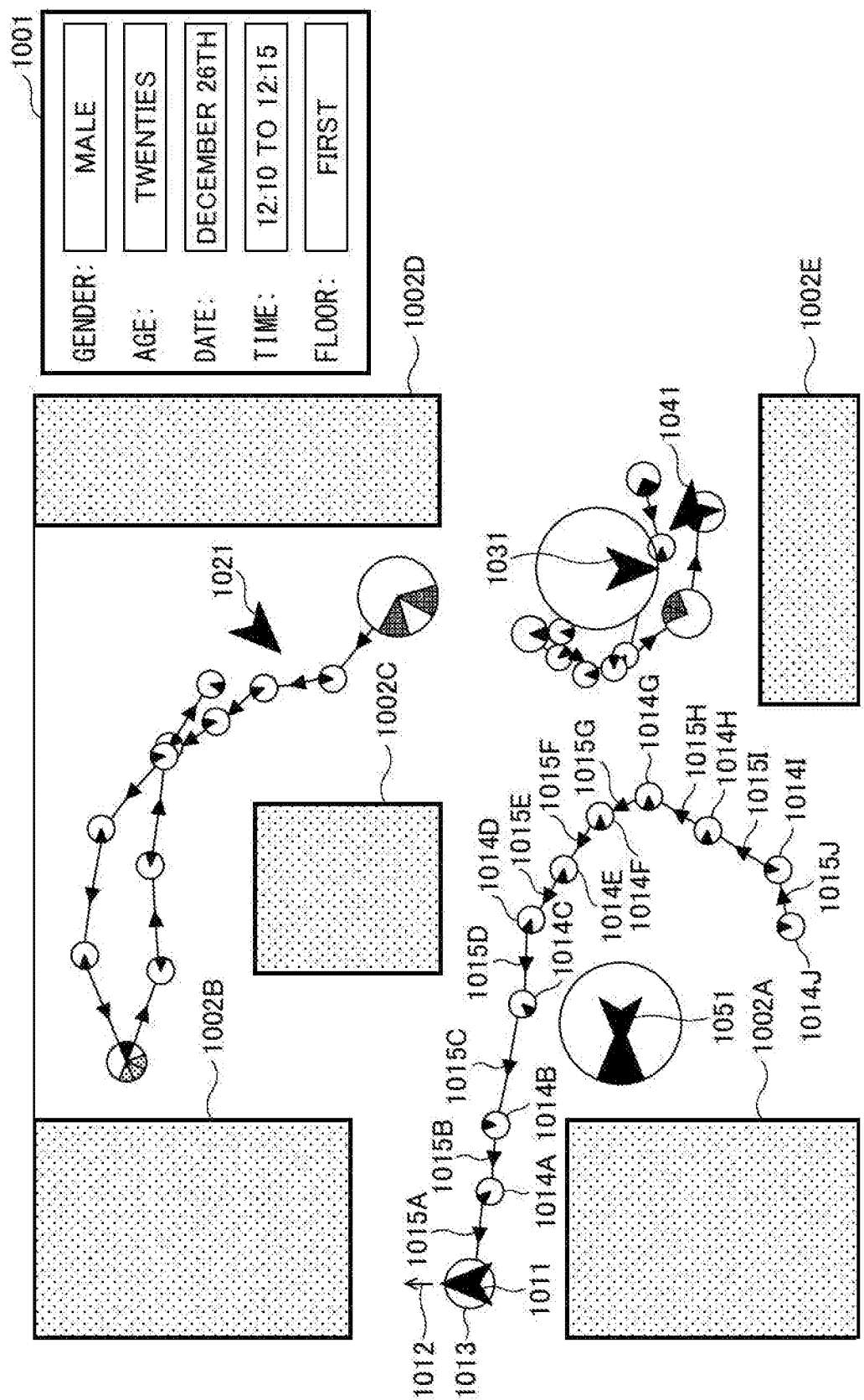
FIG. 11A is a drawing for describing an example of a display screen representing behavior of the object.
Figure 11B:
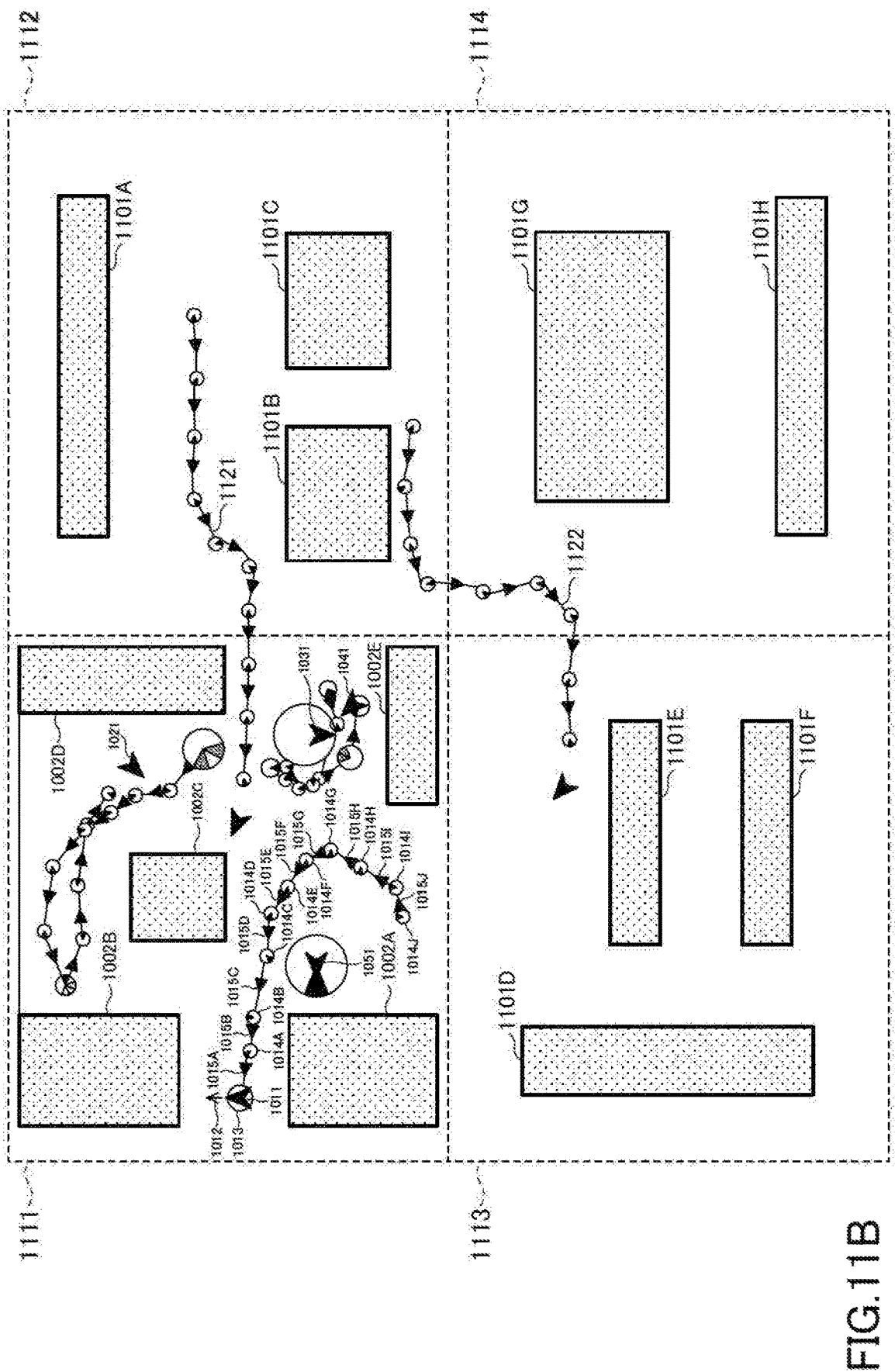
FIG. 11B is a drawing for describing an example of a display screen representing behavior of the object.
Figure 11C:
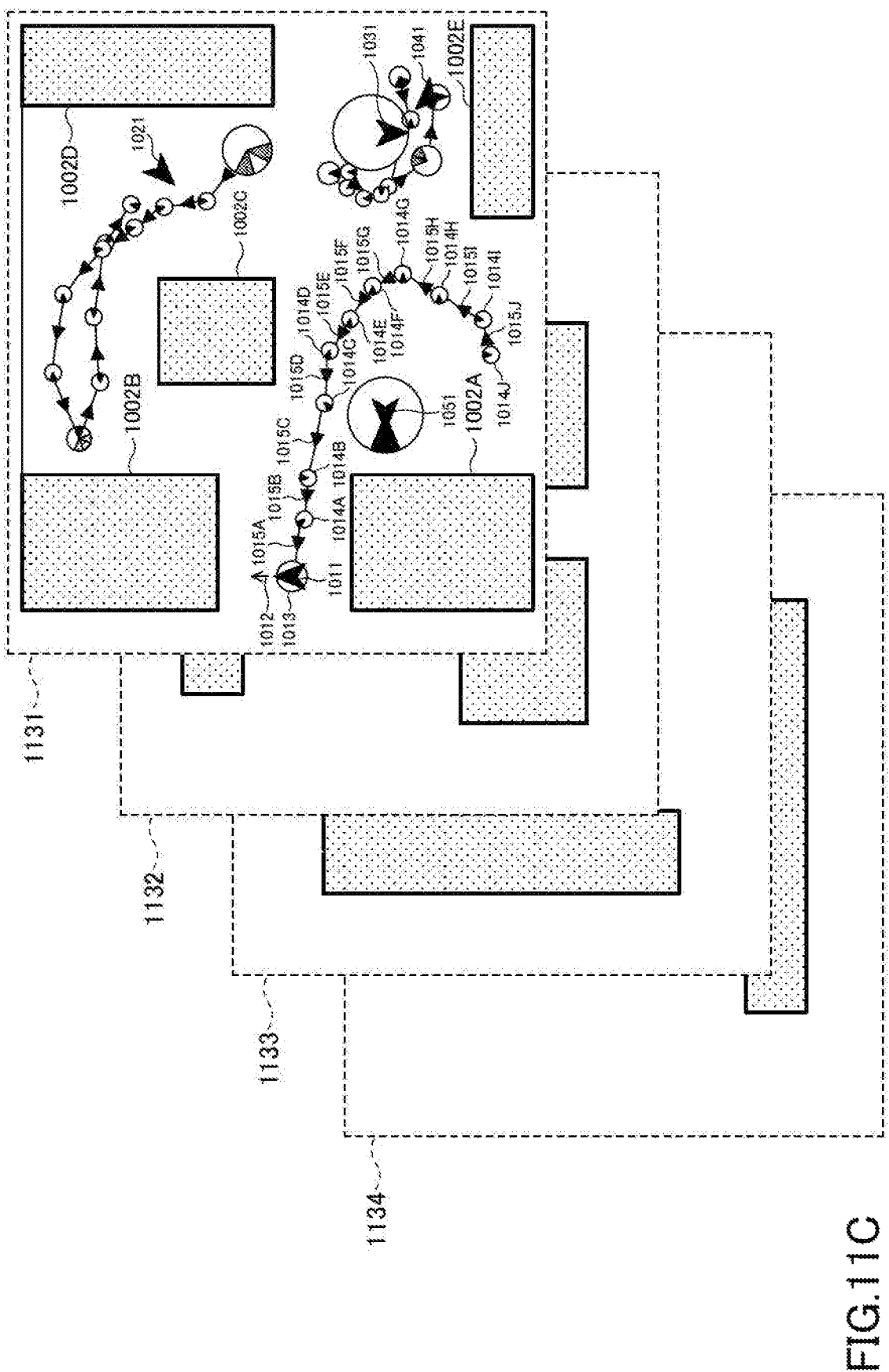
FIG. 11C is a drawing for describing an example of a display screen representing behavior of the object.

FIGS. 11A to 11C are drawings for describing examples of the display screen representing the behavior of the object displayed on a screen of the display terminal 40 by the display controller 34 of the display control device 30. In the example of FIG. 11A, as the attribute of the object to be displayed, "male" is specified to the gender, "twenties" is specified to the age, "December 26th" is specified to the date, "12:10 to 12:15" is specified to the time, and "first" is specified to the floor. The display controller 34 of the display control device 30 displays each specified condition in an extraction condition display area 1001, and based on the extraction condition, objects of a man in twenties who have visited the first floor between 12:10 and 12:15 on December 26th is to be displayed. In the example of FIG. 11A, as the attributes of the object to be displayed, "male" is specified to the gender and "twenties" is specified to the age. However, the object may be displayed without specifying the attribute of the object. For unspecified attribute, all selectable selections in the attribute are to be displayed.

In the example of FIG. 11A, the display controller 34 of the display control device 30 displays an arrangement of shelves 1002A to 1002E and behavior of objects A to E. The display controller 34 of the display control device 30 may determine positions where the shelves 1002A to 1002D are arranged using data preset in the display control device 30 or may be positions detected by the moving image analyzing device 20 from the moving image.

An icon 1011, an icon 1021, an icon 1031, an icon 1041, and an icon 1051 respectively indicate positions of the objects A to E at the last time point (i.e., 12:15) in the specified time duration. When "12:10 to present" is specified to the time in the extraction condition display area 1001, the icon 1011, the icon 1021, the icon 1031, the icon 1041, and the icon 1051 respectively indicate changes of the current positions of the objects A to E in real time.

In the following, the icon related to the object A will be described, but the same will apply to the icon related to another object. A direction 1012 pointed by the icon 1011 indicates a direction of the face or body of the object A at the last time point.

The display controller 34 of the display control device 30 displays graphic data of the size corresponding to the length of staying time of the object at a location where the object stays, as illustrated by circles 1013, 1014A, or 1014J. In this case, the display controller 34 of the display control device 30 displays graphic data of the size corresponding to the length of time in which a movement distance of the object from a position at one time point is smaller than or equal to a threshold value, at the position.

The circle 1013 represents the length of the staying time of the object A at the position of the icon 1011. The longer the staying time is, the larger the area (size) of the circle 1013 is. A central position of each of the circles 1014A to 1014J represents a position of the object A at a time point before the object A moves to the position of the icon 1011. A central position of the circle 1014J represents the position of the object A at the first time point in the specified time duration. Arrows 1015A to 1015J respectively represent the directions between the central positions of the circles 1013, 1014A to 1014J, that is, the moving direction of the object A. The longer the arrow is, the faster the speed of movement is.

The circles 1013, 1014A to 1014J represent, for example, the positions of the object A at a predetermined time interval (e.g., every 5 seconds). The direction of the face or body of the object A within a predetermined time duration from when the object A is positioned at the central position of each of the circle 1013, 1014A to 1014J, or within a predetermined distance from each central position, is also illustrated corresponding to the circles 1013, 1014A to 1014J. In the example of FIG. 11A, the circles 1013, 1014A to 1014J are equally divided into a predetermined number of regions according to the central angle of each circle, and a distribution of the face or body direction of the object A within the predetermined time duration or within the predetermined distance is represented by the brightness of the color. In the example of FIG. 11A, when the color of a region of a circle divided by 8 regions each of 45 degrees is darker (or brighter), it is indicated that the object A has faced in a direction from a center of each circle to an arc of the region for a long time.

In the example of FIG. 11A, an example in which the graphic data, such as an icon and a circle, for each object has a similar shape has been described. Alternatively, the display controller 34 of the display control device 30 may differently display a display form of the graphic data for each object, such as a shape or a color, in accordance with the gender, the age, and the like of each object estimated by the moving image analyzing device 20. For example, the graphic data, such as an icon and a circle, may blink and the shape and color of the graphic data may be changed to serve as an alarm notification function. Additionally, a line type of a travel route may be changed, or a line of the travel route may be changed to a dotted line, a dashed line, or a wave line. The area (size) of the icon for the object may be displayed larger in accordance with stop time instead of the graphic data.

In the example of FIG. 11A, an example in which a specific location (e.g., region, area, or zone) according to a frame imaged by the one imaging terminal 10 is displayed on a screen of the display terminal 40 is illustrated. However, the display controller 34 may simultaneously display continuous locations according to frames imaged by the multiple imaging terminals 10. In the example of FIG. 11B, the display controller 34 simultaneously displays locations 1111 to 1114 corresponding to the frames imaged by the four imaging terminals 10. In this case, the display controller 34 may link data related to frames imaged by the four imaging terminals 10 and continuously display the icon for each object displayed in the frame. In the example of FIG. 11B, the object F has moved from the location 1112 to the location 1111 through a travel path 1121. The object G has moved from the location 1112 to the location 1114, and then to the location 1113 through a travel path 1122.

The display controller 34 may switch and display different locations corresponding to the frames imaged by the multiple imaging terminals 10. In the example of FIG. 11C, the display controller 34 switches and displays the locations 1131 to 1134 corresponding to the frames imaged by the four imaging terminals 10. In the example of FIG. 11C, the location 1131 is the "first" floor specified in the floor attribute in the extraction condition display area 1001, that is, a location on the first floor of the building. The locations 1132 to 1134 are locations of the second to fourth floors of the building, respectively. When the specification of the floor attribute in the extraction condition display area 1001 is changed, the display controller 34 displays the specified location in the foreground.

Figure 12A:
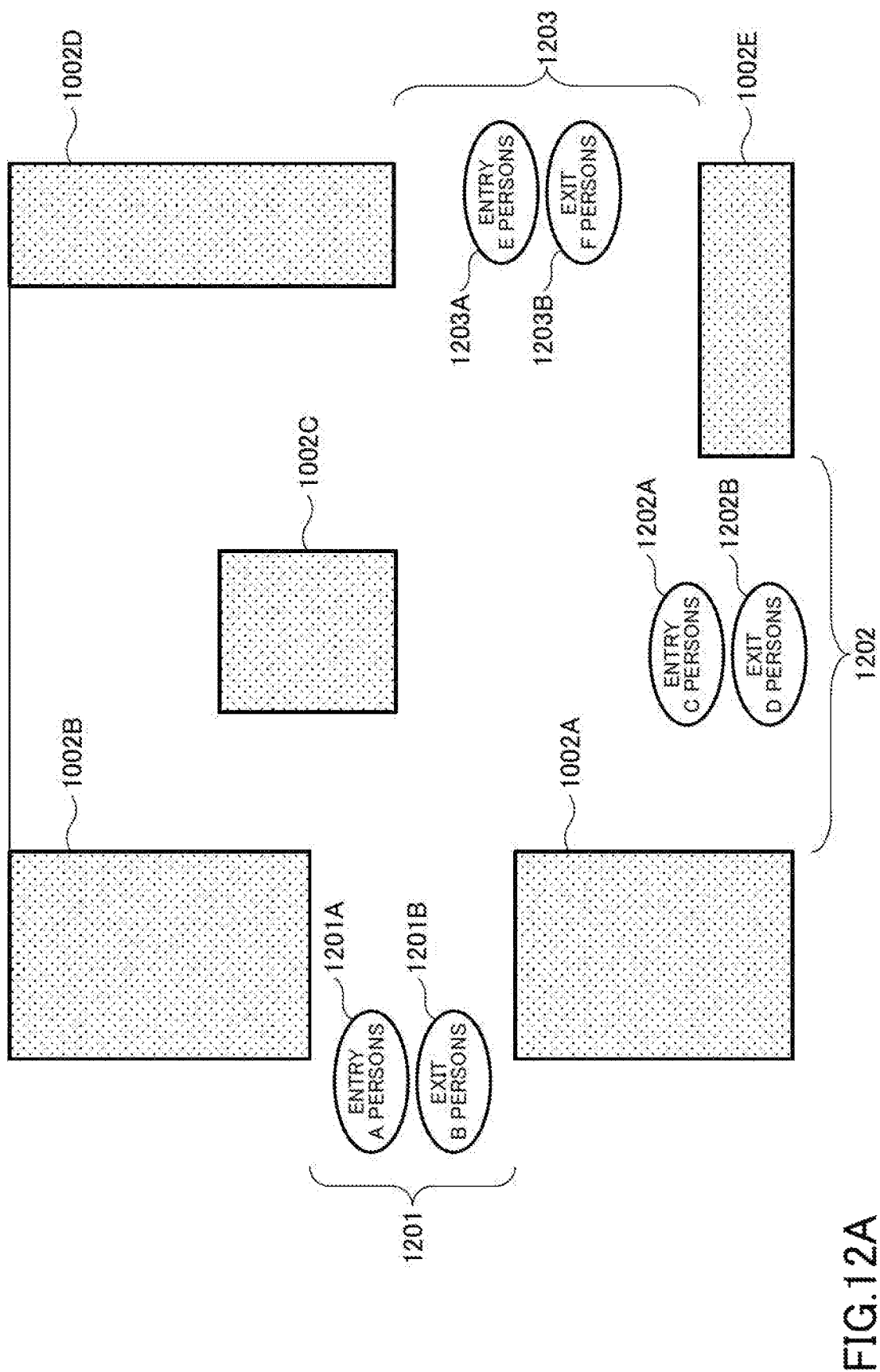
FIG. 12A is a drawing for describing an example of a display screen representing behavior of the object.

FIGS. 12A to 12B are drawings illustrating examples of a display screen representing the behavior of the object. In the example of FIG. 12A, the numbers of entering persons 1201 to 1203, and the numbers of leaving persons 1201 to 1203 are displayed in association with entrances and exits 1201 to 1203 extracted under conditions, such as a specified time duration. When the entrance and exit 1201 is selected in the screen of FIG. 12A, the display controller 34 of the display control device displays the screen of FIG. 12B.

In the example of FIG. 12B, a path 1211 of an object entering the entrance and exit 1201 and leaving from the entrance and exit 1202 and a path 1212 of an object entering the entrance and exit 1201 and leaving the entrance and exit 1203 are illustrated.

Also a path 1213 of an object entering the entrance and exit 1202 and leaving from the entrance and exit 1201, and a path 1214 of an object entering the entrance and exit 1203 and leaving from the entrance and exit 1201 are illustrated. Here, the thicker a line of each of the paths 1211 to 1214 is, the larger the number of objects passing through the path is. In the screen of FIG. 12B, when either of the paths 1211 to 1214 is selected, the display controller 34 of the display control device 30 displays the behavior of each object passing through the selected path in a display form similar to the display forms of FIGS. 10 and 11 described above.

Figure 13:
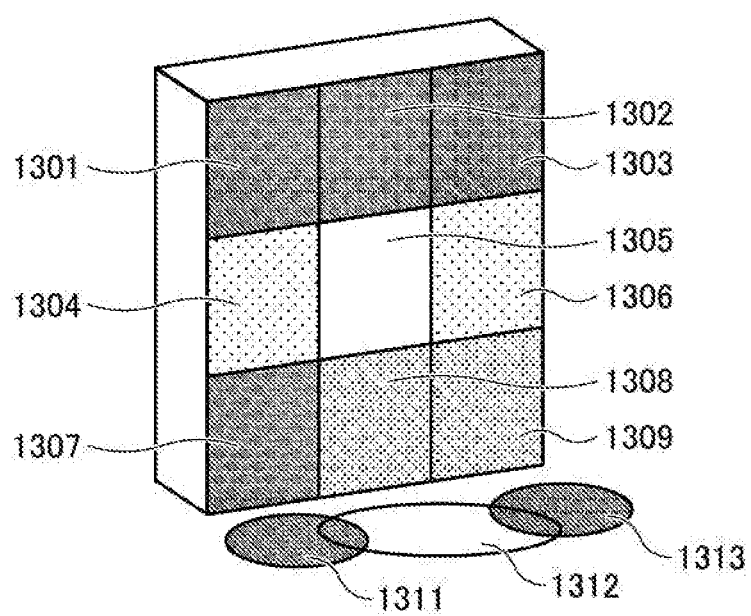
FIG. 13 is a drawing for describing an example of a display screen representing a position of an item, such as a product, that the object has reached with his/her hand.

FIG. 13 is a drawing illustrating an example of a display screen representing a position of an item, such as a product, that the object has reached with his/her hand. In the display screen of FIG. 11, FIG. 12A, or FIG. 12B, when either of the shelves 1002A to 1002D is selected, the display controller 34 of the display control device 30 displays a display screen representing the position of the product or the like that the object has reached with his/her hand in the selected shelf. The example of FIG. 13 illustrates a distribution of the number of times one or more objects have reached positions 1301 to 1309 in the selected shelf with their hands. The darker color (or the brighter color) the display controller 34 of the display control device 30 displays, for example, the greater the number of times the object has reached each of the positions 1301 to 1309 with his/her hand is. Staying positions 1311 to 1313 are staying positions of the object when the object reaches the shelf with his/her hand, and it is indicated that the larger the circle of each staying position is, the longer the object has stayed.

Figure 14:
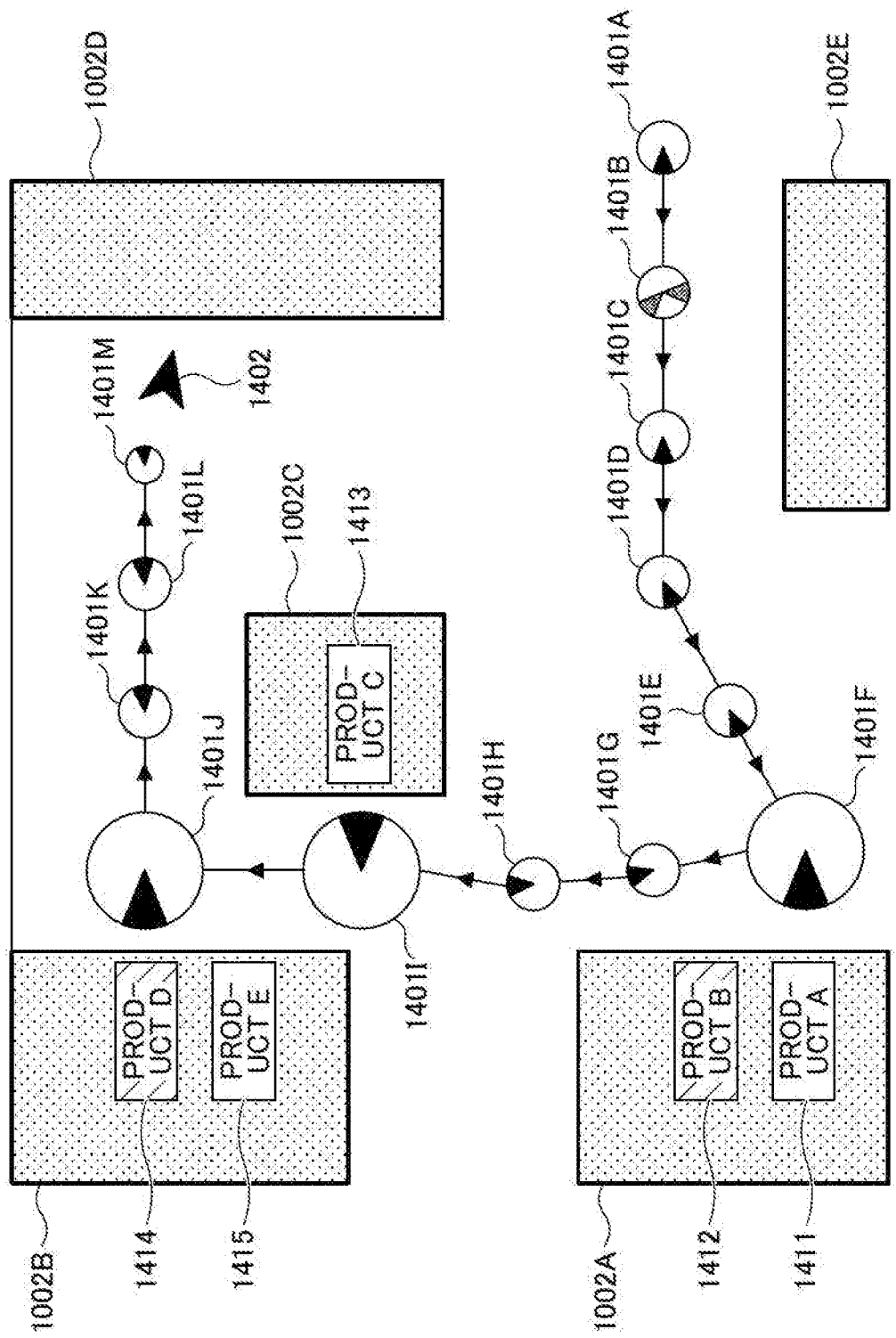
FIG. 14 is a drawing for describing an example of a display screen representing behavior of the object.

FIG. 14 is a drawing illustrating an example of a display screen representing the behavior of the object. Circles 1401A to 1401M are similar to the circles 1013, 1014A to 1014J in FIG. 11, and represent the positions and directions of the object.

In the example of FIG. 14, the display controller 34 of the display control device 30 illustrates, for example, each product disposed at a position that the object has reached with his/her hand by graphic data 1411 to 1415. The display controller 34 of the display control device 30 displays the name of each product (i.e., an example of "information about an item") in areas of the graphic data 1411 to 1415. The display controller 34 of the display control device 30 may display an icon in the shape of a human hand at a position that the object has reached with his/her hand, for example, when the graphic data of the product is not disposed at a position that the object has reached with his/her hand. The display controller 34 of the display control device 30 may display the positions at which the graphic data 1411 to 1415 are disposed and the names by using data preset in the display control device 30, or may display the positions and names by using data detected from the moving image by the moving image analyzing device 20.

The display controller 34 of the display control device 30 may display a product that the object has purchased and a product that the object has reached with his/her hand but does not purchase, in different display forms, such as making the colors different, for example. In the example of FIG. 14, the display controller 34 of the display control device 30 indicates positions where the products that the object has held and purchased have been disposed, for example, by the graphic data 1412 and the graphic data 1414. Further, the display controller 34 of the display control device 30 may indicate positions where the products that the object has reached with his/her hand but does not purchase are disposed, by the graphic data 1411, the graphic data 1413, and the graphic data 1415.

The display controller 34 of the display control device 30 may determine, for example, a product that the object has held and purchased and a product that the object has reached with his/her hand but does not purchase, by data detected from the moving image by the moving image analyzing device 20. In this case, the detector 214 of the moving image analyzing device 20 may assume that a product, for example, is purchased when the product is brought to a position of a cashier by the object. Further, the display controller 34 of the display control device 30 may determine, for example, a product that the object has held and purchased or a product that the object has reached with his/her hand but does not purchase, based on data detected from the moving image by the moving image analyzing device 20 and data obtained from a point of sale (POS) system of a shop in which the imaging terminal is installed.

Modified Example 1

The detector 214 of the moving image analyzing device 20 detects a change in a stationary object, such as a shelf and a product, from the moving image, and the display controller 34 of the display control device 30 may display graphic data representing the change in the stationary object together with the behavior of the object on the display screen illustrated in FIG. 11 or another drawing. This achieves detection of, for example, a left object, a forgotten object, shoplifting, a timing of replenishment of products, disordered arrangement of products, fire, and opening or closing of doors prohibited from opening and closing.

Figure 15A:
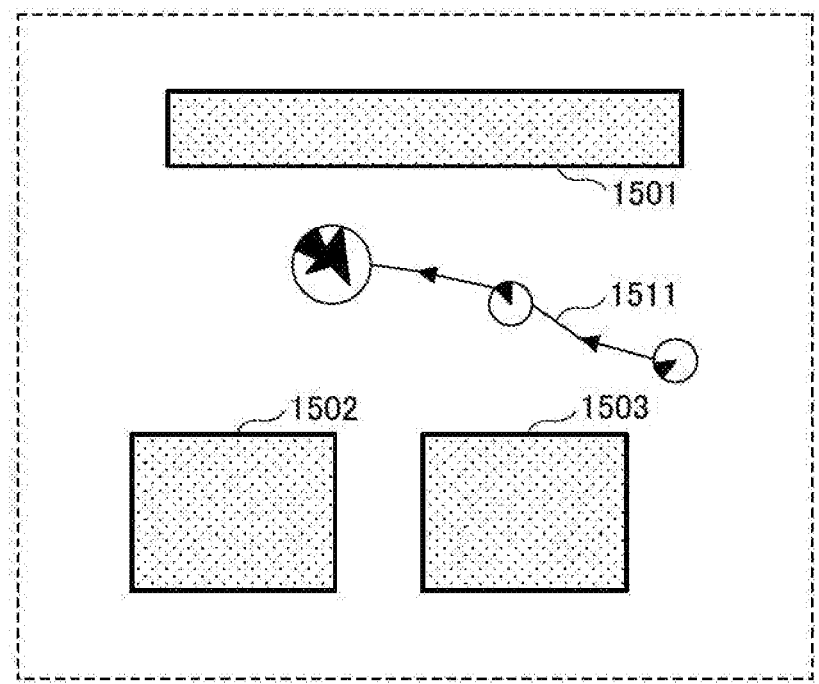
FIG. 15A is a drawing for describing an example of a process of reporting a lost item.
Figure 15B:
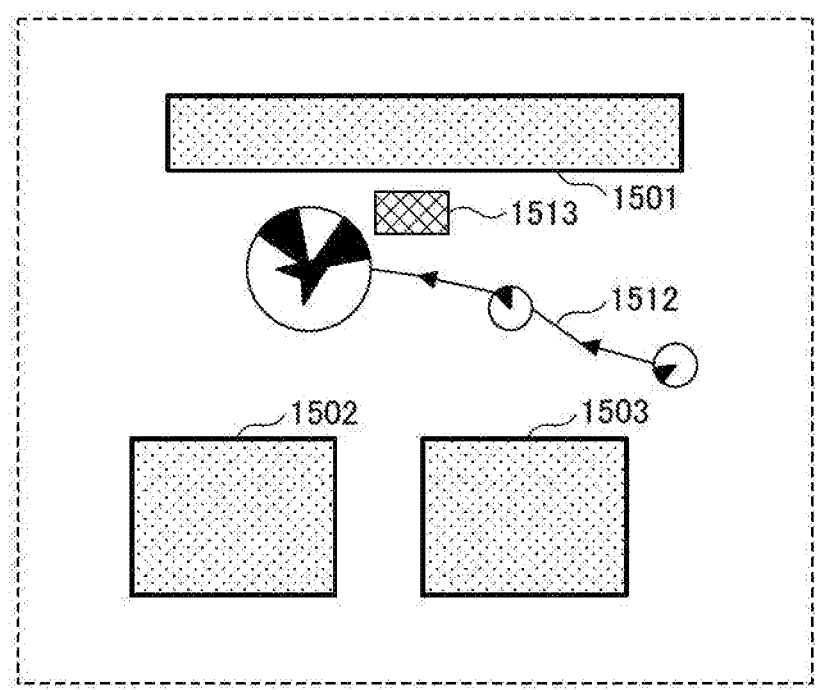
FIG. 15B is a drawing for describing an example of a process of reporting a lost item.

In this case, when an object other than the object recognized as being a person, a permanent shelf, or the like is detected in the frame, the display controller 34 may perform image recognition on the object and display graphic data representing the object, such as a bag, fire, and smoke, at a position of the object. FIGS. 15A to 15D are drawings for describing an example of a process of reporting a lost item. In the example of FIG. 15A, the display controller 34 indicates that a predetermined object moves through a travel path 1511 at a location where shelves 1501 to 1503 are located. FIG. 15B is an example of a state in which a predetermined time duration has elapsed from the state of FIG. 15A. In the example of FIG. 15B, the display controller 34 displays the predetermined object moving through a travel path 1512 and graphic data 1513 indicating an item, such as a bag, recognized as an object other than the predetermined object. Here, since a distance between the predetermined object and the item is smaller than or equal to a predetermined threshold value, the display controller 34 stores the predetermined object in association with the item.

Figure 15C:
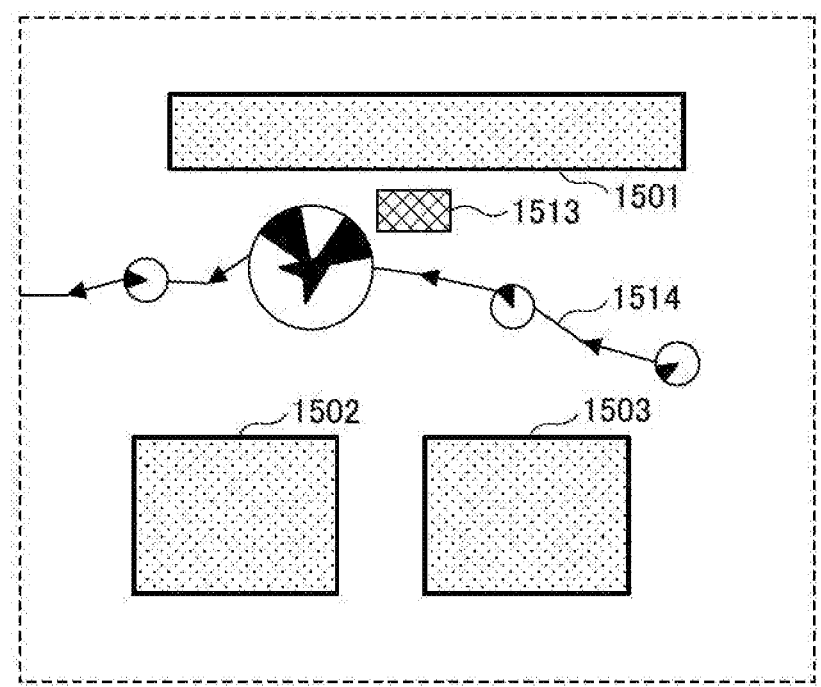
FIG. 15C is a drawing for describing an example of a process of reporting a lost item.
Figure 15D:
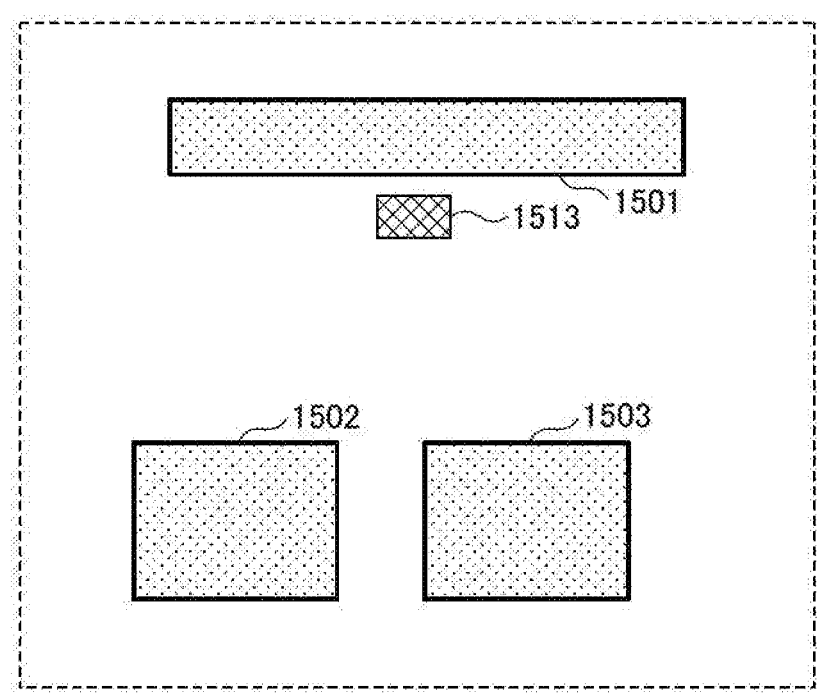
FIG. 15D is a drawing for describing an example of a process of reporting a lost item.

FIG. 15C is an example of a state in which a predetermined time duration has elapsed from the state of FIG. 15B. In the example of FIG. 15C indicates that the predetermined object moves through a travel path 1514. FIG. 15D is an example of a state in which a predetermined time duration has elapsed from the state of FIG. 15C. In the example of FIG. 15D, the predetermined object is no longer detected in the frame. The display controller 34 may notify the display terminal 40 that the predetermined object is no longer detected, for example, when the distance between the item and the predetermined object exceeds a predetermined threshold value or when a state in which the predetermined object stored in association with the item is not detected continues for a predetermined time duration or more. Alternatively, a display, such as a digital signage located near the object, may be notified.

Modified Example 2

When the object has taken a predetermined action, the display controller 34 of the display control device 30 sends a notification. In this case, the display controller 34 of the display control device 30 notifies the display terminal 40, for example, when the detector 214 of the moving image analyzing device 20 detects overturning, crouching, an entry into a prohibited area, wandering, or the like of the object.

Modified Example 3

The display controller 34 of the display control device 30 may notify the display terminal 40, or may display a shop map or the like on a display, such as a digital signage located near the object, for example, when it is detected that the object has lost his/her way. In this case, the display controller 34 of the display control device 30 may determine that the object has lost his/her way when the staying time at a predetermined position is greater than or equal to a threshold value, and when variation of the distribution of the direction of the face or the like is greater than or equal to a predetermined threshold value and the object frequently looks around.

SUMMARY

According to the above-described embodiment, the movement of the object and the direction of the face or body of the object detected based on the moving image data are obtained, and each graphic data representing the position of the object, the moving direction of the object, and the direction of the face or body of the object at each time point is displayed. Thus, the behavior of the object can be relatively easily grasped.

The above-described embodiments may be applied to a digital marketing system for analyzing whether a customer has held a product at a store or whether a customer has purchased a product at a store, a surveillance camera system for recognizing a person from an image, and the like. Additionally, by analyzing a walking route of a customer at a store, the embodiments can be adapted to study a floor layout, study an evacuation route in case of fire, and search for a lost child.

The above-described embodiments can track the behavior without identifying an individual and can protect privacy. The embodiments can also track the behavior by identifying an individual.

The above-described embodiments can be applied to a surveillance camera system or the like that recognizes a person from an image in a medical facility, a nursing facility, an elderly nursing home, and a housing for the elderly, in order to grasp behavior of a facility user and analyze a route for safely staying in the facility and reducing the number of accidents.

The embodiments of the invention have been described in detail above, but the invention is not limited to such specific embodiments, and various modifications and variations can be made within the scope of the invention as recited in the claims.

Each functional unit of the moving image analyzing device 20 and the display control device may be achieved, for example, by cloud computing including one or more computers. The moving image analyzing device 20 and the display control device may be configured as an integrated device. At least some of the functional units of the moving image analyzing device 20 may be included in the display control device 30.

What is claimed is:

1. A display control device comprising:
a receiver configured to receive data indicating a movement of an object and data indicating a direction of a face or a body of the object, detected based on moving image data; and
a display controller configured to output graphic data, the graphic data representing a position of the object, a moving direction of the object, and the direction of the face or the body of the object, at each time point in the moving image data, a form of the graphic data being determined in accordance with a length of a time duration in which the object stays, the graphic data being divided into a plurality of regions, the plurality of regions corresponding to directions in which the object faces, and a form of each of the plurality of regions being determined in accordance with a length of a time duration in which the object faces in a corresponding direction.

2. The display control device as claimed in claim 1,
wherein the display controller outputs data indicating a distribution of the direction of the face or the body of the object at a position of the object in association with the graphic data representing the position of the object.

3. The display control device as claimed in claim 1,
wherein the receiver receives data indicating a position of a hand of the object when the object reaches an item with the hand, detected based on the moving image data, and
wherein the display controller outputs graphic data representing the position of the hand of the object.

4. The display control device as claimed in claim 1,
wherein the receiver receives information about an item that the object has reached with a hand, detected based on the moving image data, and
wherein the display controller outputs the information about the item that the object has reached with the hand in association with the graphic data representing the position of the object.

5. The display control device as claimed in claim 4,
wherein the receiver receives information about an item that the object has purchased, and
wherein the display controller outputs at least either data indicating a position in which the item that the object has purchased is disposed or data indicating a position in which an item that the object has reached with the hand but does not purchase is disposed.

6. A display control system comprising:
a moving image analyzing device; and
a display control device,
wherein the moving image analyzing device includes:
an encoder configured to encode a moving image,
an obtaining unit configured to obtain data used for an encoding process of encoding the moving image by the encoder; and
a detector configured to detect characteristic data including information about a movement of an object and a direction of a face or a body of the object from the moving image based on the data obtained by the obtaining unit, and
wherein the display control device includes:
a receiver configured to receive the characteristic data; and
a display controller configured to output graphic data, the graphic data representing a position of the object, a moving direction of the object, and the direction of the face or the body of the object, at each time point in the moving image, a form of the graphic data being determined in accordance with a length of a time duration in which the object stays, the graphic data being divided into a plurality of regions, the plurality of regions corresponding to directions in which the object faces, and a form of each of the plurality of regions being determined in accordance with a length of a time duration in which the object faces in a corresponding direction.

7. A display control method performed by a display control device, the display control method comprising:
receiving data indicating a movement of an object and data indicating a direction of a face or a body of the object, detected based on moving image data; and
outputting graphic data, the graphic data representing a position of the object, a moving direction of the object, and the direction of the face or the body of the object, at each time point in the moving image data, a form of the graphic data being determined in accordance with a length of a time duration in which the object stays, the graphic data being divided into a plurality of regions, the plurality of regions corresponding to directions in which the object faces, and a form of each of the plurality of regions being determined in accordance with a length of a time duration in which the object faces in a corresponding direction.

* * * * *